United States Patent [19]

Nicholson et al.

[11] Patent Number: 4,586,991

[45] Date of Patent: May 6, 1986

[54] HYDRONIUM ($H_3O^+$) POLYCRYSTALLINE SUPERIONIC CONDUCTORS AND METHOD (ION EXCHANGE) OF MAKING SAME

[75] Inventors: Patrick S. Nicholson, Ancaster; Kimihiro Yamashita, Hamilton, both of Canada

[73] Assignee: Her Majesty the Queen in right of Canada, as represented by the Minister of Energy, Mines and Resources, Ottawa, Canada

[21] Appl. No.: 653,888

[22] Filed: Sep. 25, 1984

[30] Foreign Application Priority Data

May 2, 1984 [CA] Canada .................................. 453309

[51] Int. Cl.$^4$ ........................ C25B 1/14; G01N 27/26
[52] U.S. Cl. ........................................ 204/61; 204/421
[58] Field of Search .................... 204/60, 61, 421, 242

[56] References Cited

U.S. PATENT DOCUMENTS

| | | | |
|---|---|---|---|
| 3,440,153 | 4/1969 | Arnoldi et al. | 204/61 X |
| 3,486,995 | 12/1969 | Evers | 204/60 X |
| 4,097,345 | 6/1978 | Shannon | 204/242 X |
| 4,166,013 | 8/1979 | Fray et al. | 204/61 |
| 4,223,077 | 9/1980 | Taylor | 204/421 X |

Primary Examiner—Donald R. Valentine
Attorney, Agent, or Firm—Mitches & Co.

[57] ABSTRACT

An hydronium polycrystalline superionic conductor, having the formula $(H_3O^+,Na^+)_5(Re)Si_4O_{12}$, where Re=Y or Gd, is produced from precursor material being $Na_5YSi_4O_{12}$ or $Na_5GdSi_4O_{12}$. In order to accomplish the aforesaid a range of intermediate ceramics may be produced replacing part of the precursor ceramic sodium by ions of elements in 1A group of the Periodic Table that have an atomic weight above 32 and preferably ions of potassium, cesium, or mixtures of potassium and cesium.

To produce the superionic hydronium polycrystalline ceramic conductor and the intermediate ceramic from the feed ceramics aforesaid, the feed ceramic is placed in a chloride melt wherein part of the sodium in the feed ceramic lattice is replaced by an appropriate cation from the melt such as potassium and cesium. Subsequently, a field assisted ionic exchange takes place to now replace the interceded potassium and cesium ions with the hydronium ($H_3O^+$) ion, whereby the aforesaid hydronium, superionic, solid polycrystalline ceramic conductor is achieved.

11 Claims, 9 Drawing Figures

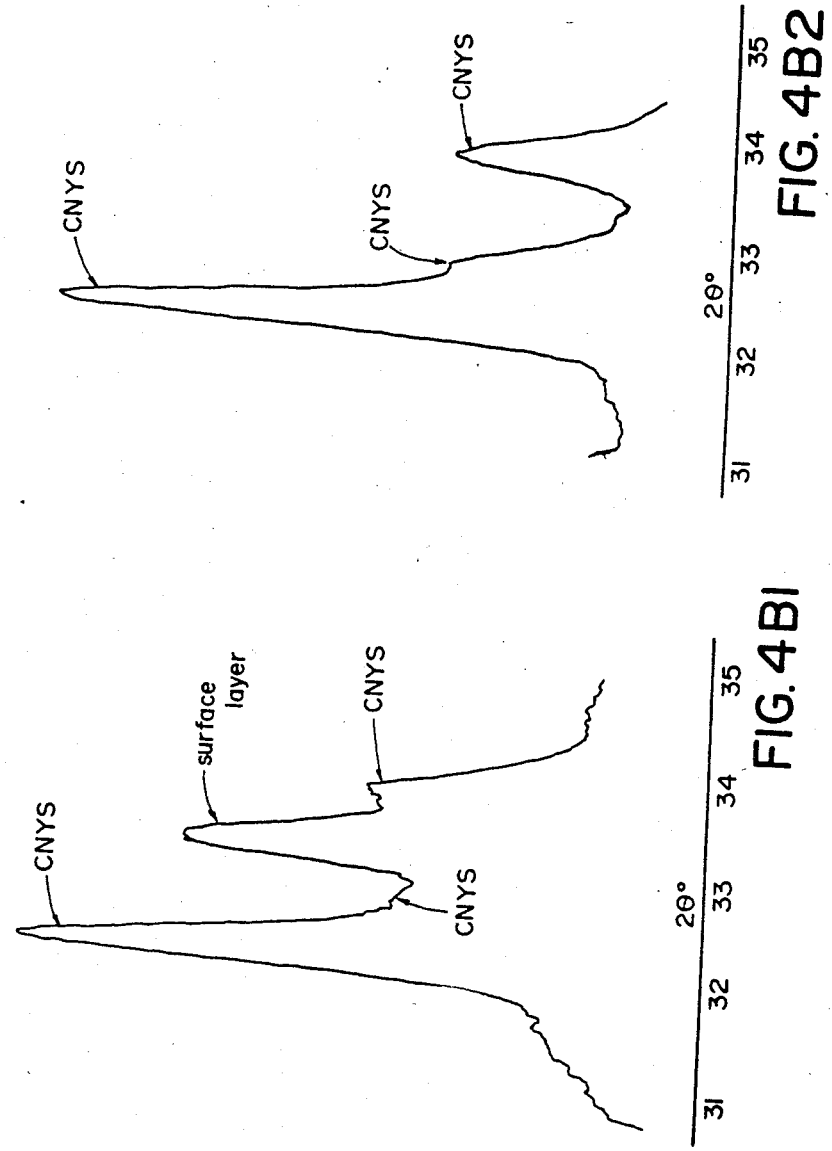

HYDRONIUM (H3O+) POLYCRYSTALLINE SUPERIONIC CONDUCTORS AND METHOD (ION EXCHANGE) OF MAKING SAME

This invention relates to a hydronium ($H_3O^+$) polycrystalline superionic conductors and a method of making the same, and to a proton conducting cell.

In one aspect, the invention employs an ion exchange method of producing a hydronium polycrystalline superionic conductor from suitable precursor materials; namely, NYS or NGS where NYS=$Na_5YSi_4O_{12}$ and NGS=$Na_5GdSi_4O_{12}$.

These precursor solid ceramics are produced in accordance with the inventors' co-pending Canadian patent application Ser. No. as yet unknown, filed Feb. 6, 1984 entitled "SILICATE SUPERIONIC CONDUCTORS AND METHOD OF MAKING SAME".

Previously known ionic conductors such as $\beta/\beta''$ alumina proton conductors have molecules in which there are a pair of coplanar conducting planes; thus, when they are sintered as a solid polycrystalline ceramic, they exhibit intermolecular non-conductive boundaries, when the coplanar conducting planes of one grain do not allign with an adjacent grain.

The precursor solids NYS and NGS of this invention have molecules with 3-dimensional conductivity; thus, when molecules are in juxtaposition forming a solid polycrystalline ceramic, they do not exhibit any non-conductive boundaries between adjacent grains. This and other features of the invention make the precursors, when converted, a highly suitable proton conductor.

The invention contemplates therefore converting NYS and NGS by various means, into proton conductors with the general formula $$(H_3O^+, Na^+)_5(Re)Si_4O_{12}$$

where Re=Y or Gd.
sub.nom. HNYS or HNGS.

According to the invention, the precursor solids, NYS and NGS are converted into an appropriate intermediary precursor of the following formula $$(X^+, Na^+)_5(Re)Si_4O_{12}$$

where $X^+$ is preferably either $K^+$, $Cs^+$ or mixtures of $K^+$ and $Cs^+$.

Generally, $X^+$ is an ion in the 1A group of the Periodic Table with an atomic weight greater than that of sodium, i.e. greater than 23.

These intermediary precursors, which themselves are solid polycrystalline ceramics, are further converted to the target proton conductor or hydronium ion conductor having the following general formula; namely, $$(H_3O^+, Na^+)_5(Re)Si_4O_{12}$$

where Re=Y or Gd.
The need to establish the intermediary precursors of the general formula $$(X^+, Na^+)_5(Re)Si_4O_{12}$$

aforesaid stems from the need to establish a crystal lattice structure for each of the molecules of the polycrystal such that the physical size thereof and particularly of $(X^+, Na^+)$ is approximately that of hydronium ($H_3O^+$). The $X^+$ ion is at a later stage replaced by $H_3O^+$. Expanding the molecular lattice this way to form the intermediary precursor, the $X^+$ ion can then be replaced by the hydronium without over-stressing the lattice structure during creation of the target hydronium conducting ceramic.

Those skilled in the art should know that the size of various ions is as follows:

| Ion | Size |
|---|---|
| $H_3O^+$ | 1.5 Å |
| $Na^+$ | 0.9 Å |
| $K^+$ | 1.4 Å |
| $Cs^+$ | 2.67 Å |

Note, that $K^+$ and $Cs^+$ molecularly are sized equal to or greater than that of $H_3O^+$. Thus $X^+$ is preferably $K^+$ or $Cs^+$.

To alter the interstitial space of the molecular lattice of the feed ceramic, the the invention contemplates a method of ion exchange of the feed precursors, NYS or NGS, in melts possessing certain specific mole fractions of sodium replacing ions (members of the 1A group of the Periodic Table) and particularly potassium and cesium. The melts are chlorides or nitrates. As a further example, mixtures of potassium chloride and cesium chloride may be used as well as those mixtures in combination with sodium chloride, or corresponding nitrates.

In all cases there are two steps of ionic exchange. The feed ceramic is converted first into the intermediate ceramic by immersing the same in an appropriate chloride melt aforesaid.

The immersion of the feed ceramic in the chloride or nitrate melts is iterated through successive steps whereby the dimensional spacing of the molecules of the feed ceramic are altered and it is converted thereby into the intermediate ceramic. At each iteration, the mole concentrations of the cations of the melt are changed.

The intermediate ceramic is then subjected to a field assisted ionic exchange to achieve the target ceramic.

The target ceramic may then be employed directly as an element in a proton conducting cell but preferably its surfaces are polished in order to eliminate boundary scaling prior to its employment in such environment.

The invention therefore contemplates an intermediary precursor being a solid polycrystalline ceramic of the general formula $$(X^+, Na^+)_5(Re)Si_4O_{12}$$

where Re=Y or Gd and X is an element in Group 1A of the Periodic Table with atomic weight greater than 23. Preferably $X^+$ is $K^+$ or $Cs^+$ or mixtures of $K^+$ and $Cs^+$.

The invention also contemplates a proton conducting cell comprising;
 (a) the proton conductor $(H_3O^+, Na^+)_5(Re)Si_4O_{12}$ immersed in a medium selected from steam and an aqueous solution; and,
 (b) electrodes attached to opposite sides of the ceramic, wherein Re=Gd or Y.

The invention also contemplates a process for producing an hydronium conducting solid polycrystalline ceramic comprising the steps of;

(a) selecting as a feed ceramic one of a group of precursor polycrystalline ceramics comprising $Na_5YSi_4O_{12}$ and $Na_5GdSi_4O_{12}$;

(b) immersing the said feed ceramic of said step (a) into a chloride or nitrate melt for a period of between 10 to 20 hours whereby to exchange, some of the sodium ions thereof by cations of the melt whereby to create an intermediate ceramic of the general formula $$(X^+Na^+)_5(Re)Si_4O_{12}$$

where $X^+$ is $K^+$, $Cs^+$, or $K^+/Cs^+$ (c) immersing the said intermediate ceramic of step (b) into an ion exchange solution of acid, while, (d) subjecting the intermediate ceramic to a potential difference across its surfaces while so immersed; and, (e) maintaining the concentration of free hydrogen on one side of the ceramic for a period of at least 3 hours whereby to create a target ceramic of the general formula $$(H_3O^+,Na^+)_5(Re)Si_4O_{12}$$

where $Re = Y$ or $Gd$

The acid aforesaid is preferably sulphuric or acetic.

The invention will now be described by way of example and reference to the accompanying drawings in which.

Figures 3, 4A:
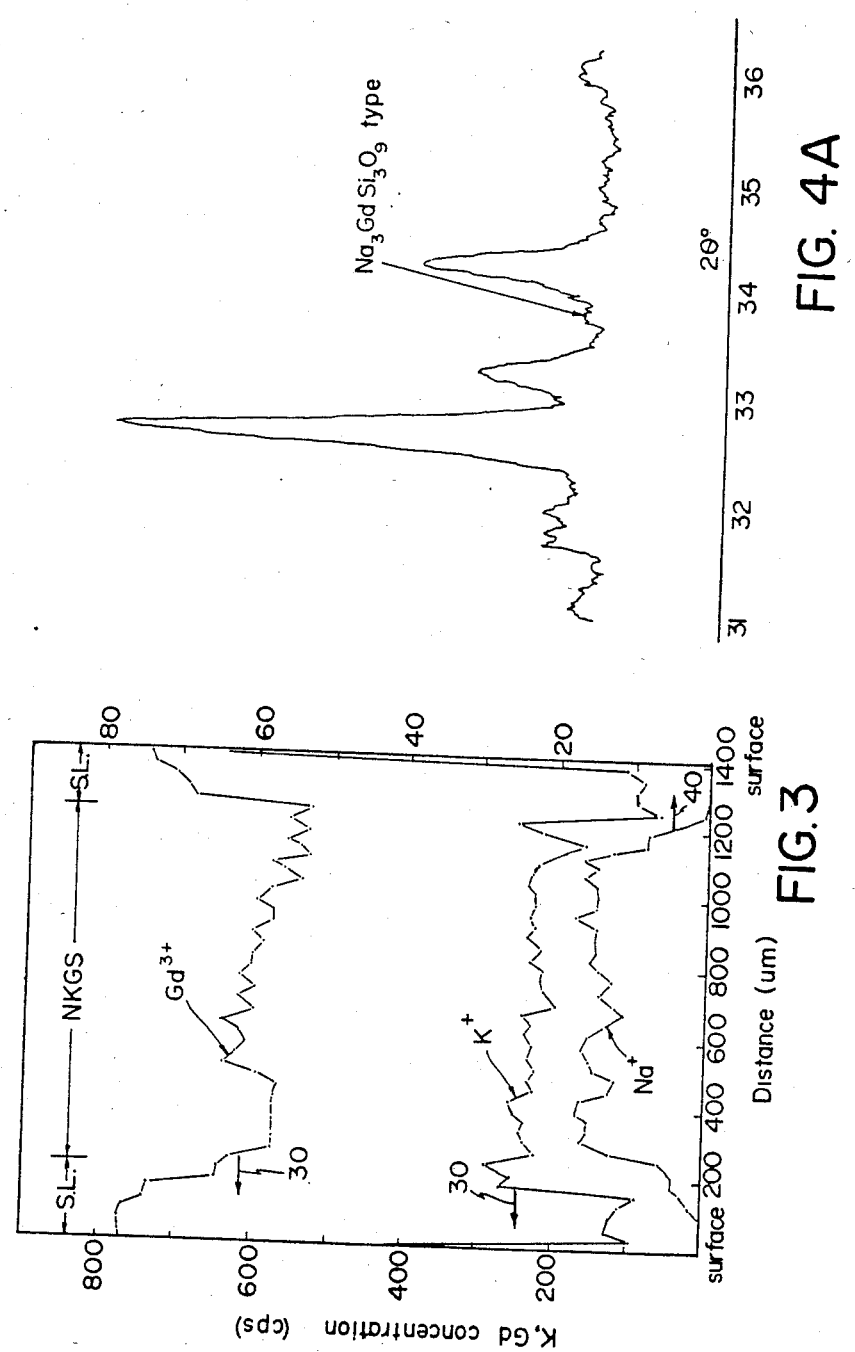
FIG. 3 is a distribution map of $Na^+$, $K^+$ and $Gd^{3+}$ ions in NKGS (an intermediate ceramic) as provided by electron probe micro analysis (EPMA).

FIG. 4 are x-ray diffraction patterns of the intermediate ceramics, FIG. 4A of NKGS and FIG. 4B of NCYS; FIG. 4B(1) with unpolished surfaces; FIG. 4B(2) with polished surfaces.

Figure 5:
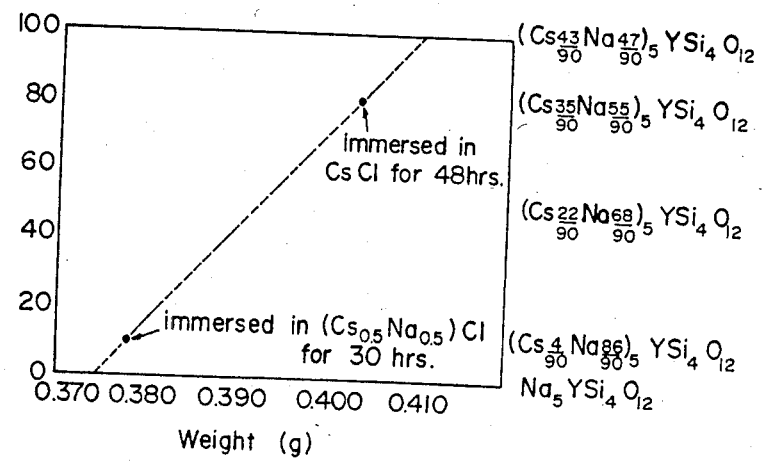
Figure 6:
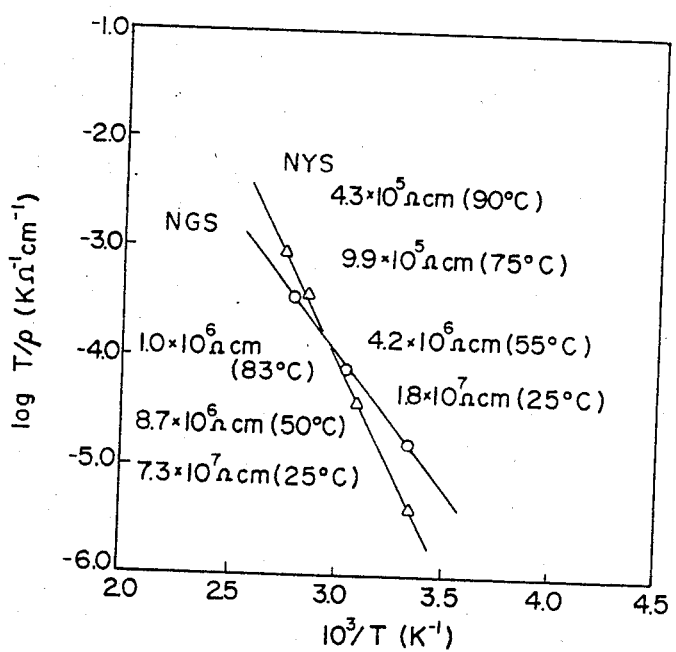

FIG. 5 is a plot of weight change of NYS during iterative immersion in CsCl melts of various cation concentrations, according to the invention in an electrolysis cell;

FIG. 6 plots temperature dependence for proton migration rate of a specimen target HNYS.

Figure 2:
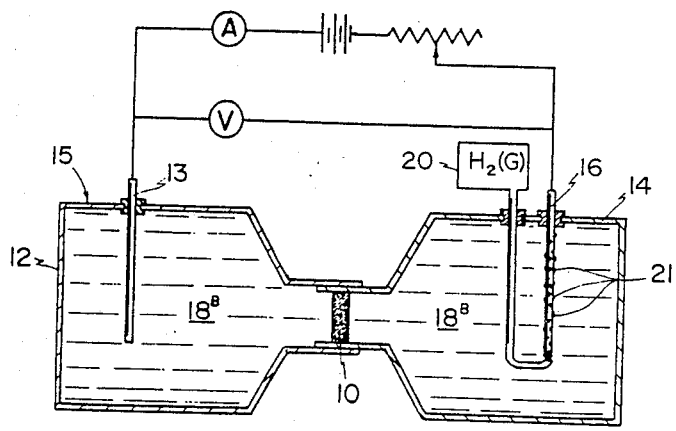
FIG. 2 is the field assisted ionic cell that is employed to execute the field assisted ionic exchange converting the intermediate ceramic to the target ceramic.
Figure 7:
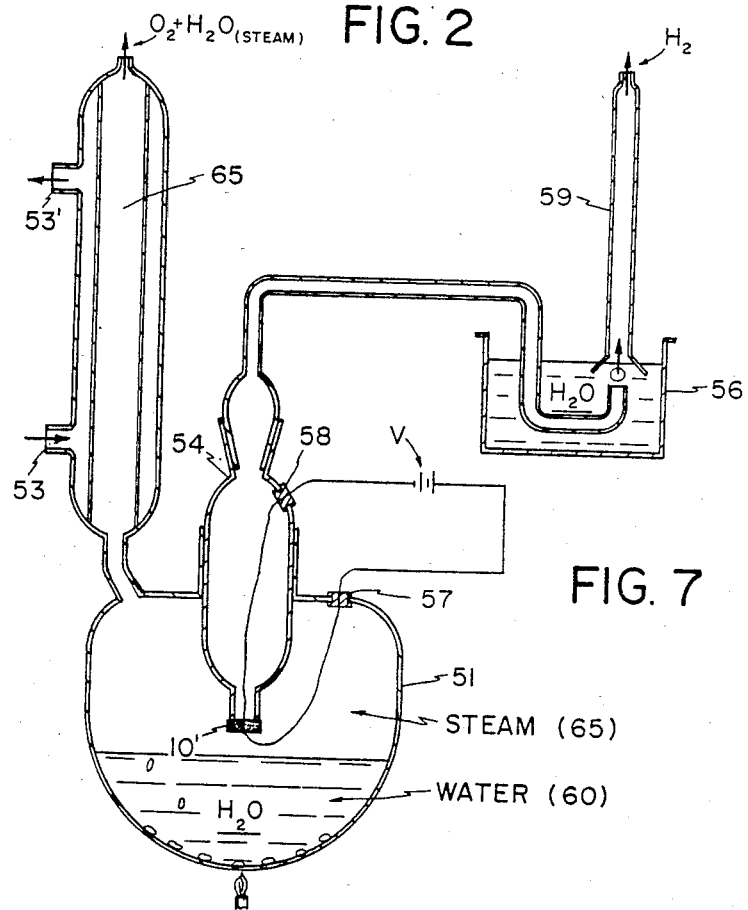

FIG. 7, located with FIG. 2, is a proton cell employing the target proton conducting ceramics of the invention.

Figure 1:
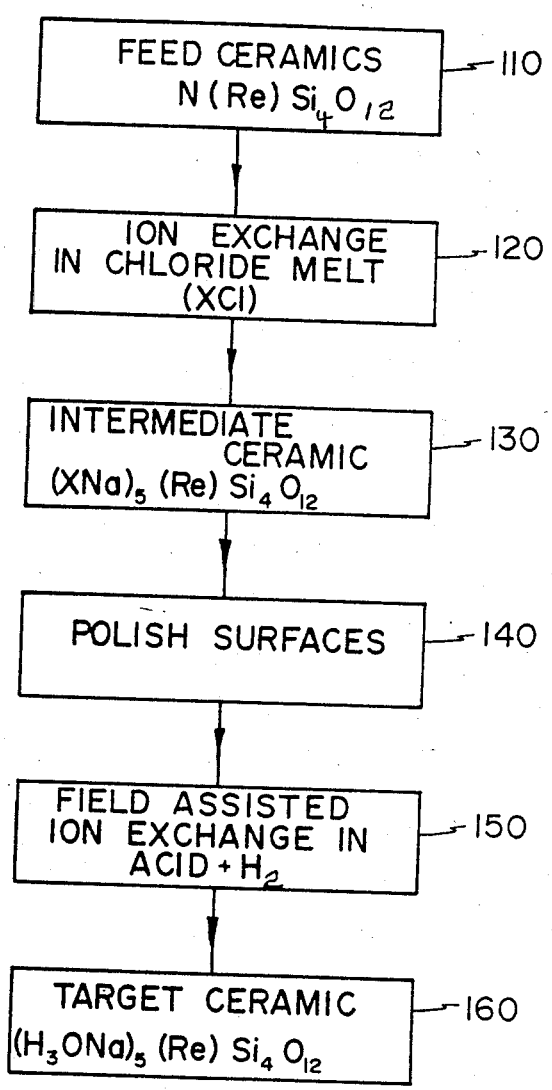
FIG. 1 is a flow chart of the method according to the invention.

Referring to FIGS. 1 and 2, a suitable feed ceramic is composed of either NGS or NYS and is preferably created according to our co-pending patent application aforesaid. This feed ceramic which is selected at step 110 in FIG. 1, is placed, by step 120 into a chloride melt, where the anions thereof are $K^+$, $Cs^+$ or melts thereof. In this respect, and referring to FIG. 5, depending upon the chemical composition and molar concentration of the melt 18, sodium ions in the feed ceramic 10 are displaced by cations of the melt, in this case mixtures of cesium and potassium. We prefer, however, to "slow down" the reaction when the feed ceramics are placed in the chloride melt. This can be simply achieved by mixing the desirable chloride melts with sodium chloride. This makes for a much less vicious exchange of the cations, since within the melt there are already some sodium ions.

Thus, preferably, we select chloride melts being either potassium chloride and/or cesium chloride, and sodium chloride to make the exchange less vicious. In the former case potassium displaces the sodium ions in the feed ceramic and in the latter cesium displaces the sodium ions. The chloride melt can also be a mixture of sodium and cesium chloride of various concentrations. The intermediate ceramic has thus a mixture of $Cs^+$ and $K^+$ anions with $Na^+$. Depending upon the molar concentrations of the chloride melt on the anions an intermediate ceramic will result with various ratios of cesium ions or of potassium ions or of both having displaced most of the sodium ions in the feed ceramic. FIG. 5 depicts, by the dash line, such events when the feed ceramic, N(Re)S of step 110 is selected as $Na_5YSi_4O_{12}$ and for various molar concentrations of CsCl e.g. $(Cs_{0.5}Na_{0.5})Cl$. The immersion time for step 120 ranges from 30 to 48 hours and is dependent upon the molar fraction of the cation. (See Table I)

An identical linear plot is achieved when the feed ceramic step 110 is selected as $Na_5GdSi_4O_{12}$.

Where, in step 120, a melt of potassium chloride is used, the linear relationship 55 is achieved and the resultant intermediate ceramic has various displacements of the sodium ion by the potassium ion from $$\left(K\frac{4}{90}Na\frac{86}{90}\right)_5 YSi_4O_{12} \text{ to } \left(K\frac{43}{90}Na\frac{47}{90}\right)_5 YSi_4O_{12}$$

that is similar to FIG. 5. Similarly when the feed ceramic of step 10 is $Na_5GdSi_4O_{12}$ identical plots are achieved. Thus the intermediary precursor ceramics have the general formula $$(X^+Na^+)_5(Re)Si_4O_{12}$$

where $X^+$ preferably is $K^+$, $Cs^+$, or $K^+/Cs^+$ and Re is Y or Gd. Accordingly, in the aforesaid procedure there are three different types of intermediary precursors fathered from NYS and three additional types of intermediary precursors fathered from NGS each resulting from which type of chloride melt is used; cations of cesium; potassium; cesium and potassium; and upon the actual melt used at step 120 and their respective molar concentrations.

We prefer that the melt be of sodium and potassium at step 120 and maintained at a temperature of 800° C. so that the molar fraction is $[K^+]/[Na^+]+[K^+])=0.45$.

Referring to FIG. 3, the same represents the distribution mass of an intermediate ceramic sample of KNGS, resulting from step 130, when probed by EPMA for ions of $Na^+$, $K^+$ and $Gd^{3+}$ respectively as indicated on the chart. The regions indicated "S.L." are the surface layers on either side of the material sample and each shows, in the case of $Gd^{3+}$ a marked increase thereat. (The plot for a sample of NKYS is identical.) By polishing, step 140, these surfaces with jewellers' rouge, the surface layers are removed and disappear. Confirming the same and, referring to FIG. 4A with the intermediate as KNGS, when subjected to x-ray diffraction, the same indicates a surface layer peak as approximately 33°. This peak disappears after the polishing, step 140.

For intermediate ceramics of CNYS, the x-ray diffraction patterns of FIGS. 4B1 and 4B2 more clearly show, in the former, the surface layer, and in the latter, the removal of the surface layer by the disappearance of the secondary peak at approximately 33½° after polishing with jewellers' rouge.

From the foregoing, it is apparent, therefore, that polishing of the surfaces of the intermediate ceramic, in order to establish a heterogeneous quality thereof should be conducted prior to the field assisted ion exchange step 150 of FIG. 1 as a separate polishing step. As will become apparent, when the potassium ion, or the cesium ion, or mixtures of those are replaced with hydronium, hydronium ion concentration at the surface layer is avoided by having the surface layer first removed by polishing prior to the ion exchange step 150. If polishing does not take place, as it can be omitted, the field assisted ion exchange step following, is extraordinarily long in duration. Hence the polishing step 140 is to be preferred. After the field assisted ion exchange occurs, step 150, the target ceramic $(H_3O^+,Na^+)_5(Re)Si_4O_{12}$ results as step 160.

Whether the feed ceramic be NYS or NGS and the melts used in step 120 be cations of potassium or of cesium or mixtures thereof with sodium, in each instance, the intermediate ceramic is either KNGS or KNYS; $(K,Na)_5(Re)Si_4O_{12}$, where Re=Y or Gd and exhibits a plot almost identical to that of FIG. 3 (KNGS) save and except the peak for $Gd^{3+}$, $K^+$ and $Na^+$ for KNYS are shifted 50 to 100 microns ($\mu m$) as illustrated by arrow 30 in the figure, while that of $Na^+$ is shifted to the right, arrow 40, by the equivalent magnitude.

Now referring again to FIG. 1, after the intermediate precursor is created at step 130 and the surfaces polished at step 140, the intermediate precursor sample 10 is placed in a field assisted ion exchange cell 15, FIG. 2, as step 150 of FIG. 1. The ion exchange cell 15 has two compartments 12 and 14 and the intermediate precursor ceramic 10, is placed therebetween in the centre as shown. Each side of the cell is filled with an acid, preferably acetic, nitric, sulphuric or mixtures thereof. Into both compartments extend platinum electrodes 13 and 16 placed on either side of the sample 10 with electrode 16 having hydrogen gas bubbled over its surface. This ensures that the pH of the solution is maintained low. In due course, the target ceramic $H_3O^+Na^+(Y/G)S$, at step 160 is achieved. In this environment the voltage across the electrodes 13 and 16 is between 1 and 240 volts and the hydrogen gas is bubbled over the electrode 16 throughout the duration of the exchange, preferably 20 hours at 40 volts.

At the end of 20 hours, the specimen 10 is converted into the target ceramic HNYS, step 160. The identical procedure is followed if the intermediate precursor ceramic specimen 10 is any of the NGS derivatives whereupon the target ceramic achieved is HNGS. Chloride melts of ion mixtures of potassium, cesium and of sodium may also be used effectively.

Referring specifically now to FIGS. 4B(1) and 4B(2) one of the four intermediate cesium ceramics, CNYS, was selected for x-ray diffraction analysis and the pattern of FIG. 4B(1) emerged showing a secondary peak of $2\theta$ at approximately 34½°. This represented a surface layer crust of impurity product on the sample $(Cs,Na)_3(Re)Si_3O_9$. The sample surfaces were polished using jeweller's rouge and, the x-ray diffraction results of the polished sample are shown in FIG. 4B(2). Note the former surface layer peak at 34½° now disappears.

The target ceramics of HNYS or HNGS are thus achieved at step 160 from the appropriate intermediate ceramic 130 via step 140 whatever the 6 intermediate ceramics be.

Returning to step 120, where cesium is used as a cation in the melt, it is held at approximately 680° C. with a molar concentration of $[Cs^+]/([Na^+]+[Cs^+])=0.5$ mole.

Where the mixture of cesium, potassium and sodium cations in the chloride are used, as the melt 18 of step 120, (Cs,K,Na)Cl is held to approximately 600° C. with a ratio of $[Cs^+]:[K^+]:[Na^+]:=40:12:48$ mole %. Alternatively, the ratios can be $[Cs^+]:[K^+]:[Na^+]:=30:35:35$ and an appropriately resulting target ceramic is achieved at 150, is either HNGS type or HYGS type.

The aforesaid procedures are summarized in Table I.

Referring to FIG. 7 the target ceramic achieved at step 160 may be used in a hydrolysis cell 50 as the active element for hydrolysing water, steam, into its constituent components. The glass cell chamber 51 contains, therefore, water over a burner or flame so as to generate in chamber 51, steam or superheated steam, and a water condensation column 53 communicating therewith. The column has a water cooling jacket through which as via arrows 53 and 53' cooling water flows. A sample of target material 10' resulting at step 160 of FIG. 1 is located at the lower orifice of an intermediate capture chamber 54 whose lower end extends into the chamber 51 but above the water therein. The upper end of the capture chamber 54 communicates through a water trap 56 into a collection column 59 where hydrogen gas is recovered.

Electrodes of platinum are attached to opposite surfaces of the sample 10' with one of the conductors passing through a sealing grommet 57 in the vessel wall 51 to the positive terminal of a voltage source V. The negative terminal of the source V is connected by a second conductor through a second sealing grommet 58 disposed in the wall of the capture chamber 54 and thence passes to the opposite surface of the sample 10'. A voltage of 1 to 240 volts, preferably 50 volts or so, is applied across the sample and hydronium ions migrate across the sample from the steam 65 in chamber 51 into the collection column 54 to become neutralized by the electric charge of the voltage source V; releasing hydrogen gas into the collection column 54.

The following two equations define the reaction, equation 1 in the glass chamber 51 and equation 2 in the capture chamber 54.

$$3H_2O - 2e^- \rightarrow 2H_3O^+ + \tfrac{1}{2}O_2 \uparrow \qquad (1)$$

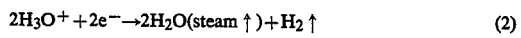

$$2H_3O^+ + 2e^- \rightarrow 2H_2O(\text{steam} \uparrow) + H_2 \uparrow \qquad (2)$$

From the foregoing it can be seen that electrons are taken off of the water (steam 65) molecules in chamber 51 causing the molecules to turn into hydronium ions which then migrate across the hydronium conductor 10'. Electrons are given back to the hydronium ions (reassociated at the electrode in collection chamber 54) generating steam and hydrogen in the collection chamber 54. In order to capture $H_2 \uparrow$, the steam must be cooled down hence the water bath 56 through which the steam is bubbled, condenses the same and the hydrogen gas $H_2 \uparrow$ is collected at the top of the collection column at pipette 59. The upper portion of the vessel 51 communicates through a cooling tower or condenser with cooling water jacket flowing via 53, 53'. Oxygen and steam are collected at the upper end.

TABLE I

| Materials | Ion Exchange Method detail of Step 120* | |
|---|---|---|
| N(YorG)S | Sintering of N(YorG)S powders | |
| NK(YorG)S | Ion-exchange method - OPTION 1 | |
| | (1) Immerse N(YorG)S in (Na, K)Cl melt with $[K^+]/([Na^+] + [K^+]) = 0.25$ at 800° C. | (2) After (1), transfer materials into (Na, K)Cl melt with $[K^+]/([K^+] + [Na^+]) = 0.50$ |
| NC(YorG)S | Ion-exchange method - OPTION 2 | |
| | (1) Immerse N(YorG)S in (Cs, Na)Cl melt with $[Cs^+]/([Na^+] + [Cs^+]) = 0.50$ at 680° C. | (2) After (1), transfer materials into CsCl melt. |
| NKC(YorG)S | Ion-exchange method - OPTION 3 | |
| | (1) Immerse N(YorGd)S in (Cs, K, Na)Cl melt with the ratio of $[Cs^+]:[K^+]:[Na^+] = 40:12:48$ at 600° C. | (2) After (1), transfer materials into (Cs, K, Na)Cl melt with the ratio of $[Cs^+]:[K^+]:[Na^+] = 30:35:35$. |

*All ratios are expressed in mole %.

The embodiments of the invention in which an exclusive property or privilege is claimed are defined as follows:

1. A process for producing an hydronium conducting solid polycrystalline ceramic comprising the steps of;
   (a) selecting as a feed ceramic one of a group of precursor polycrystalline ceramics comprising $Na_5YSi_4O_{12}$ and $Na_5GdSi_4O_{12}$;
   (b) immersing the said feed ceramic of said step (a) into a chloride melt for a period of between 10 to 20 hours whereby to exchange, some of the sodium ions thereof by cations of the melt whereby to create an intermediate ceramic of the general formula $$(X^+Na^+)_5(Re)Si_4O_{12}$$ 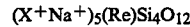

where $X^+$ is $K^+$, $Cs^+$, or $K^+/Cs^+$
   (c) immersing the said intermediate ceramic of step (b) into an ion exchange acid; while,
   (d) subjecting the intermediate ceramic to a potential difference across its surfaces while so immersed; and,
   (e) maintaining the concentration of free hydrogen on one side of the ceramic for a period of at least 3 hours whereby to create a target ceramic of the general formula $$(H_3O^+,Na^+)_5(Re)Si_4O_{12}$$ 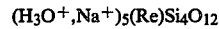
   where Re=Y or Gd.

2. The process as claimed in claim 1, including immediately after step (b) and prior to step (c) the additional step of polishing the surface thereof whereby to remove scaling thereon.

3. The process as claimed in claim 1 or 2, wherein the chloride melt of step (b) includes as a cation, sodium.

4. The process as claimed in claim 1 or 2, wherein the chloride melt of step (b) includes as a cation, sodium, potassium or cesium as additional cations.

5. The process as claimed in claim 1 or 2, wherein the melt of step (b) contains cations selected from the group of potassium, cesium, or mixes of potassium and cesium.

6. The process as claimed in claim 1 or 2, wherein step (c) incorporates as an acid sulphuric, acetic and nitric acid.

7. The process as claimed in claim 1 or 2, wherein the acid of step (c) is sulphuric acid.

8. The process as claimed in claim 1 or 2, wherein the acid selected in step (c) is nitric acid.

9. The process as claimed in claim 1 or 2, wherein the acid selected in step (c) is acetic acid.

10. The process as claimed in claim 1 or 2, wherein step (e) includes bubbling free hydrogen gas into one side of the ceramic.

11. The process as claimed in claim 1 or 2, wherein step (c) includes inserting the intermediate ceramic into the ion exchange acid so as to divide the acid into two compartments; and wherein step (d) includes immersing into each compartment of the acid an electrode, both electrodes connected to the potential difference whereby one is an anode and the other cathode and wherein step (e) includes the bubbling of free hydrogen gas over the cathode.

* * * * *